UNITED STATES PATENT OFFICE.

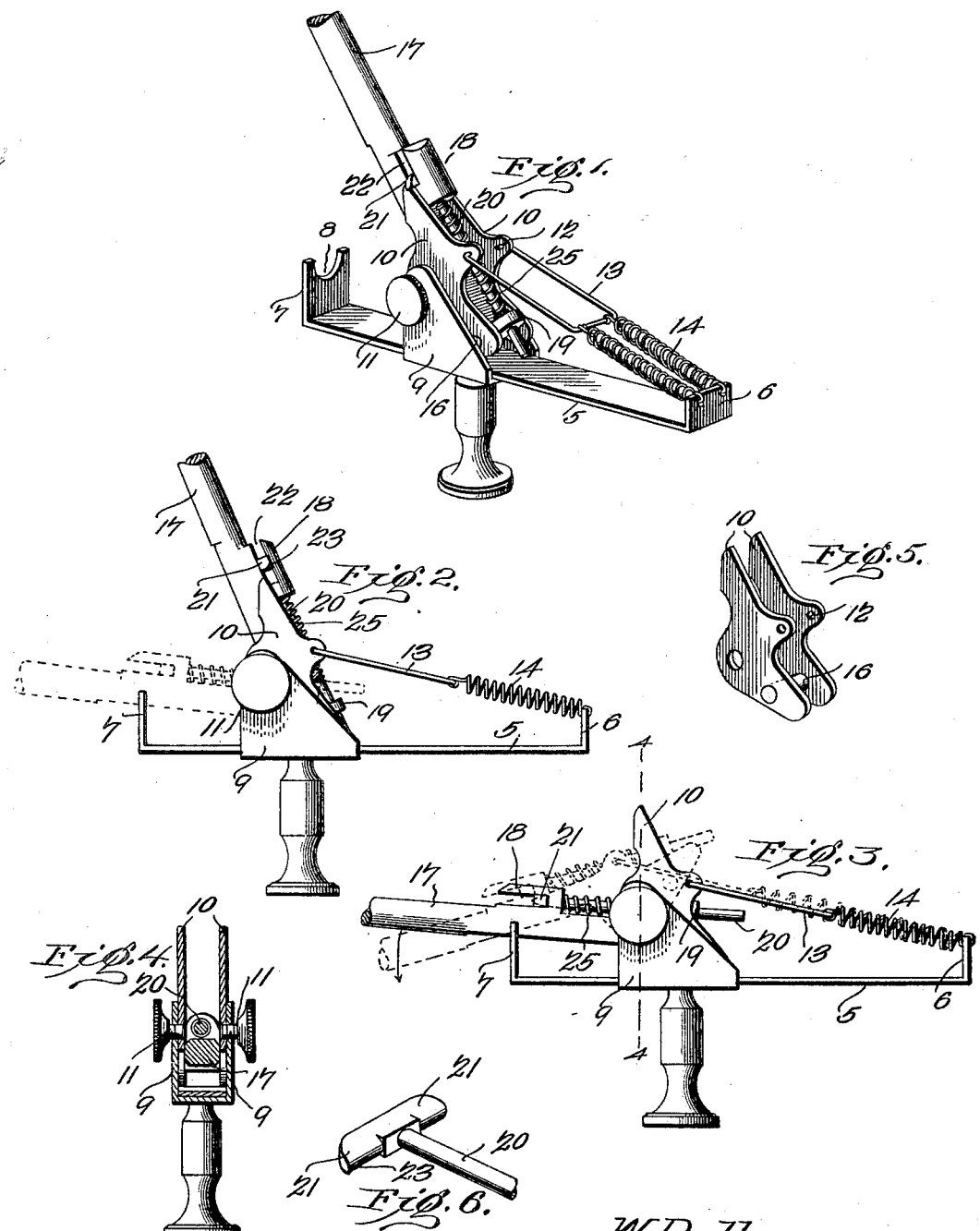

WILLIAM PULLMAN AND CHARLES C. FIELD, OF SODUS, NEW YORK.

TROLLEY-POLE.

SPECIFICATION forming part of Letters Patent No. 697,884, dated April 15, 1902.

Application filed October 11, 1901. Serial No. 78,366. (No model.)

*To all whom it may concern:*

Be it known that we, WILLIAM PULLMAN and CHARLES C. FIELD, citizens of the United States, residing at Sodus, in the county of Wayne and State of New York, have invented a new and useful Trolley-Pole, of which the following is a specification.

This invention relates to certain improvements in trolley-poles, and has for its object to provide an improved form of support which will be automatically disconnected from the pole when the trolley-wheel jumps from the conducting-wire, the pole being dropped to an approximately horizontal position out of the path of the trolley-wire-supporting arms and guy-wires.

A further object is to provide for the ready adjustment of the pole to operative position after such releasing movement.

With these and other objects in view the invention consists in the novel construction and combination of parts hereinafter described, illustrated in the accompanying drawings, and particularly pointed out in the appended claims.

In the drawings, Figure 1 is a perspective view of a trolley-pole and its supporting devices constructed and arranged in accordance with our invention. Fig. 2 is a side elevation of the same, showing the pole disconnected from its support and illustrating in dotted lines the position which the pole assumes when released. Fig. 3 is a view similar to Fig. 2, showing the pole in the released position in full lines and showing in dotted lines the manner of connecting the pole to the support for returning to operative position. Fig. 4 is a transverse sectional elevation of the device on the line 4 4 of Fig. 3. Fig. 5 is a perspective view of the pole-carrier detached. Fig. 6 is a similar view of the bolt employed to lock the trolley-pole and its carrier.

5 designates the base of the structure, said base being preferably in form of an elongated plate having at one end a vertical spring-attaching flange 6 and at the opposite end a vertically-disposed flange 7, having a recess 8, in which the pole is seated when in inoperative position. The base is of any required size and shape and is mounted in any suitable manner on the trolley-car.

On each side of the base-plate 5 are formed ears or standards 9, between which is pivoted a pole-carrier formed of two plates 10 of corresponding shape and size, one plate being united to each of the ears or standards by suitable pivot pins or screws 11. In the forward edges of the plates are openings 12 for the reception of the ends of a yoke or link 13, which serves as a means for connecting the tension-springs 14 to the carrier, although the springs may be connected directly to the plates, if desired. The plates are connected near their lower forward edges by a pivot-pin 16, on which is swiveled the lower end of a trolley-pole 17, the latter being provided at its upper end with any ordinary form of trolley-wheel for contact with the current-conducting wire. On the forward face of the trolley-pole are formed two lugs 18 and 19, having alining openings in which is guided a bolt 20, the upper end of said bolt being provided with laterally-projecting carrier-engaging dogs 21, which are guided in a suitable slot 22 at the upper or rear portion of the lug 18. The forward face of each dog is slightly rounded, as shown at 23 in Fig. 6, and the upper rear edges of the carrier-plates are also rounded, so that the dogs may freely pass the plates when the parts are being moved into engaging position. The lower end of the pin or bolt 20 is adapted for engagement with the base-plate 5 and when so engaged will release the locking-dogs from engagement with the carrier-plates. When the trolley-wheel is in engagement with the conducting-wire, the parts will be held in a position such as indicated in Fig. 1, the springs acting to hold the wheel in contact with the wire and tending to draw the trolley-pole forward. If the trolley-wheel jumps the wire, the pole and its carrier are immediately drawn toward the springs, causing the end of the bolt 20 to come into contact with the base-plate 5. The bolt is moved upwardly against the action of a coiled compression-spring 25, which surrounds said bolt, and the locking-dogs 21 are moved out of engagement with the carrier-plate 10. This position is illustrated in full lines in Fig. 2. The pole will then fall by gravity to the position shown by dotted lines in Fig. 2 or by full lines in Fig. 3, the under side of the pole resting in the socket 8. Any excessive forward movement of the carrier-plates 10 is prevented by the contact of the lower forward edges of said plates with the base 5.

To adjust the parts to an operative position, the pole is drawn downwardly in the direction of the arrow in Fig. 3, this movement being effected by the usual pulling rope or cord attached to the upper portion of the trolley-pole. The seat or socket 8 acts as a fulcrum for the pole, and the pivot-pin 16, which connects the end of the pole to the carrier-plates, is elevated, causing a rearward and downward movement of the upper ends of said plates. The curved rear ends of the plates engage with the curved faces 23 of the dogs 21 and force such dogs to the rear until the front edges of the plates have passed beyond the dogs, the latter being then moved to the initial position by the spring 25. The carrier-plates being again locked to the pole are allowed with the pole to reassume the normal position, the pole being gradually released until the trolley-wheel is again in contact with the conducting-wires.

The device is automatic in its action and will instantly drop the trolley-pole as soon as the trolley-wheel leaves the wire, thus avoiding all danger of breaking the guy-wires or the trolley-wire-supporting arms. When the trolley-car is moving into the barn or other place where it becomes necessary to lower the arm, the pole is pulled down until the wheel is disengaged from the wire and then allowed to move forwardly under the influence of the spring or springs 14 until the locking-dogs are disengaged by the contact of the bolt 20 with the base-plate 5. The pole will then drop to the inoperative position.

Although the structure herein described and illustrated is the preferred form of the device, it is obvious that many changes may be made in the form, proportions, size, and minor details of construction without departing from the spirit or sacrificing any of the advantages of the invention.

Having thus described our invention, what we claim is—

1. The combination of the trolley-pole, a pivoted carrier for said pole, a slidable locking-bolt for holding the trolley-pole in operative position, the lower portion of said bolt being adapted for contact with a fixed point to effect its movement to a releasing position, substantially as specified.

2. The combination of the trolley-pole, a pivoted carrier to which said pole is pivoted, the pivotal connection between the pole and its support being arranged in advance of the fulcrum-point of the carrier, and means for locking the pole to its support, substantially as specified.

3. The combination of the carrier, a pivotal support for said carrier, a trolley-pole pivotally connected to said support at a point in advance of the pivotal support of the carrier, means for locking the pole to the support, and a seat or support arranged at the rear of the fulcrum-point of the carrier and forming a fulcrum for the trolley-pole while the latter is being locked to its carrier, substantially as specified.

4. The combination of the carrier, a trolley-pole pivoted thereto, a spring connected to said carrier, a locking-bolt with which said carrier is held in contact by said spring, the lower end of said bolt being adapted for contact with a fixed point, and a seat or support forming a fulcrum for the trolley-pole while the latter is being locked to its carrier, substantially as specified.

5. The combination with a pivoted carrier or support, of a trolley-pole pivotally connected to said carrier or support at a point at one side of the pivotal or fulcrum of said carrier, a locking member carried by the trolley-pole and adapted for engagement with said carrier at a point on the opposite side of said fulcrum, and a spring normally tending to hold said carrier in contact with said locking member, substantially as specified.

6. The combination with a pivoted carrier or support comprising a pair of carrying-plates of a trolley-pole pivoted between said plates, a slidable bolt carried by said trolley-pole and having locking-dogs for engagement with said plates, a spring or springs connecting said plates to a fixed point, and a seat or support adapted to hold said trolley-arm when the latter is in inoperative position and forming a fulcrum-point for said trolley-pole when the latter is being locked to its carrier, substantially as specified.

In testimony that we claim the foregoing as our own we have hereto affixed our signatures in the presence of two witnesses.

WILLIAM PULLMAN.
CHARLES C. FIELD.

Witnesses:
  PRINE RIGGS,
  E. F. HOUGHTON.